US012740567B2

(12) United States Patent
Gonzales et al.

(10) Patent No.: US 12,740,567 B2
(45) Date of Patent: Sep. 22, 2026

(54) ANTI-MICROBIAL DISINFECTANT AND METHODS OF USE AND PRODUCTION THEREOF

(71) Applicant: Pan-Micro Bioscience, Inc., Atherton, CA (US)

(72) Inventors: Gilbert R. Gonzales, Tucson, AZ (US); Immanuel Thangaraj, Atherton, CA (US); Nigel R. Stevenson, Sugar Hill, GA (US); Bruce K. Patterson, Menlo Park, CA (US); Cynthia Doerr, Houston, TX (US)

(73) Assignee: Pan-Micro Bioscience, Inc., Atherton, CA (US)

( * ) Notice: Subject to any disclaimer, the term of this patent is extended or adjusted under 35 U.S.C. 154(b) by 789 days.

(21) Appl. No.: 17/801,605

(22) PCT Filed: Feb. 25, 2021

(86) PCT No.: PCT/US2021/019574
§ 371 (c)(1),
(2) Date: Aug. 23, 2022

(87) PCT Pub. No.: WO2021/173778
PCT Pub. Date: Sep. 2, 2021

(65) Prior Publication Data

US 2023/0309562 A1 Oct. 5, 2023

Related U.S. Application Data

(60) Provisional application No. 63/016,543, filed on Apr. 28, 2020, provisional application No. 62/990,086, filed on Mar. 16, 2020, provisional application No. 62/981,596, filed on Feb. 26, 2020.

(51) Int. Cl.
*A01N 59/00* (2006.01)

(52) U.S. Cl.
CPC .................................... *A01N 59/00* (2013.01)

(58) Field of Classification Search
None
See application file for complete search history.

(56) References Cited

U.S. PATENT DOCUMENTS 5,385,650 A * 1/1995 Howarth .................. C25B 1/24 423/500
8,367,120 B1 2/2013 Norton et al.

FOREIGN PATENT DOCUMENTS

WO 2020019047 A1 1/2020

OTHER PUBLICATIONS

Hartman et al. (Spectroscopic Investigation of the formation of Hypochlorite Radiolysis by product in 5M NaCl featuring high energy proton beam line experiments, 224th ACS National Meeting, Boston, MA, Aug. 18-22, 2002 (Year: 2002).*

Quan et al. (Bactericidal activity of strong acidic hypochlorous water against *Eschericia coli* O157:H7 and Listeria monocytogenes in biofilms attached to stainless steel, Food Sci Biotechnol (2017) 26(3):841-846). (Year: 2017).*

Kiamco et al. (Hypochlorous-Acid-Generating Electrochemical Scaffold for Treatment of Wound Biofilms, Scientific Reports (2019)9: 2683). (Year: 2019).*

Envirotech (Blending HBr with bleach to form Hypobromous Acid, accessed online Nov. 5, 2025).*

Hartman et al. (Spectroscopic determination of hypochlorous acid, in chloride brine solution, featuring 5 MeV proton beam line experiments, Radiation Physics and Chemistry 66 (2003) 335-341).*

Kelm et al. (Spectroscopic Investigation on the formation of hypochlorite by alpha radiolysis in concentrated NaCl solution, Applied Radiation and Isotopes, vol. 51 No. 6, Dec. 1, 1999).*

Hartman, T., "Spectroscopic Investigation of the Formation of Hypochlorite, Radiolysis By-Product in 5 M NaCl Featuring High-Energy Proton Bean Line Experiments", 224th ACS National Meeting, Boston, MA, Aug. 18-22, 2002.

Kelm, M., et al., "Spectroscopic investigation on the formation of hypochlorite by alpha radiolysis in concentrated NaCl Solutions", Applied Radiation and Isotopes, Elsevier, Oxford, GB, vol. 51 , No. 6, Dec. 1, 1999, pp. 637-642.

Wang, Yunting et al., "Generation and application of reactive chlorine species by electrochemical process combined with UV irradiation: Synergistic mechanism for enhanced degradation performance", Science of the Total Environment, vol. 712, Jan. 7, 2020, p. 136501.

Quan, Yaru et al., "Bacterial activity of strong acidic hypochlorous water against *Eschericia coli* 0157:H7 and Listeria monocytogenes in biofilms attached to stainless steel", Food Science and Biotechnology, the Korea Society of Food Science and Technology, Heidelberg, vol. 26, No. 3, Jun. 27, 2017, p. 842.

PCT Office, International Search Report and Written Opinion issued in PCT/US2021/019574 dated May 11, 2021.

* cited by examiner

*Primary Examiner* — Melissa S Mercier
(74) *Attorney, Agent, or Firm* — Wood Herron & Evans LLP

(57) ABSTRACT

An acid solution and method of making an acid solution are provided. The method includes exposing a reactant solution to an energy beam to form the acid solution, the reactant solution includes water and a salt. The salt is selected from a group consisting of a chloride salt and a bromide salt and the acid solution is selected from a group consisting of a hypochlorous acid solution and a hypobromous acid solution.

16 Claims, No Drawings

ANTI-MICROBIAL DISINFECTANT AND METHODS OF USE AND PRODUCTION THEREOF

CROSS-REFERENCE TO RELATED APPLICATIONS

This is a national stage application, filed under 35 U.S.C. § 371, of International Patent Application No. PCT/US2021/019574, filed Feb. 25, 2021, the contents of which is hereby incorporated by reference in its entirety. International Patent Application No. PCT/US2021/019574 claims priority to, and the benefit of the filing date of, each of U.S. Provisional Application No. 62/981,596, filed Feb. 26, 2020, the contents of which is hereby incorporated by reference in its entirety, U.S. Provisional Application No. 62/990,086, filed Mar. 16, 2021, the contents of which is hereby incorporated by reference in its entirety, and U.S. Provisional Application No. 63/016,543, filed Apr. 28, 2021, the contents of which is hereby incorporated by reference in its entirety.

TECHNICAL FIELD

Embodiments of the invention are directed to disinfectants, and directed to producing and using disinfectants for surfaces and body mucous membrane, including conjunctiva, and more particularly compositions and method of producing large and consistently reproducible quantities of antimicrobial agents against bacteria, archaea, protozoa, algae, fungi, viruses, and helminths using external and directed energies.

BACKGROUND

Pandemic infectious diseases, where most people do not have immunity, are becoming more prevalent. This is due to a number of factors including global population growth, widening immigration and rapid travel to and from nearly all areas of the most populated parts of the world.

The prevention of spread of emerging infections including viruses, multidrug resistant bacteria, multi-drug resistant mycobacteria and other pathogens presents the healthcare community with great challenges. Many of these infections are unknown or poorly understood especially at the onset and the protection of those exposed is critical in containing the infection radius and minimizing the numbers of infections and ultimately at times death. As opposed to vaccines and specific anti-pathogen therapeutics, prevention strategies need to be effective and broad spectrum. Efficacy and broad-spectrum activity frequently do not coexist especially when one thinks of a potential agent to treat extremely different pathogens such as viruses, bacteria, mycobacteria, and possibly fungi. It is not obvious that an agent even exists that could be effective and broad-spectrum to address emerging pathogens of great diversity in a population setting.

As an example of clinical need, viruses with pandemic potential including H1N1, H5N1, and H5N7 influenza viruses, and severe acute respiratory syndrome (SARS)/Middle East respiratory syndrome (MERS) coronaviruses (CoV) have emerged in recent years and have caused great morbidity and mortality. SARS-CoV, MERS-CoV, and influenza virus, as it relates to this application, can survive on surfaces for extended periods for months at a time. There is great variability in the survival of these viruses on surfaces due to strain variation, titer, surface type, suspending medium, mode of deposition, temperature and relative humidity.

As opposed to blood borne transmission of viruses, the importance of indirect contact transmission (involving contamination of inanimate surfaces) is critical to containment of the epidemic. The influenza viruses and SARS-CoV/MERS-CoV may be shed into the environment and be transferred from environmental surfaces to hands of patients and healthcare providers. Emerging data suggest that MERS-CoV also shares these properties. Once contaminated from the environment, hands can then initiate self-inoculation of mucous membranes of the nose, eyes or mouth.

Mathematical and animal models, and intervention studies suggest that contact transmission is the most important route in scenarios involving these viruses. By comparison HIV, a blood borne virus has poor viability on environmental surfaces. Infection prevention and control implications should include the need for hand hygiene and personal protective equipment to minimize self-contamination and to protect against inoculation of mucosal surfaces and the respiratory tract, and enhanced surface cleaning and disinfection in healthcare settings.

Additionally, the clinical need for rhinovirus prevention of infection and reduction of infectivity demands a pan-viral destruction approach. The large number, large sequence and the diversity of rhinoviruses are also evolving recombinant and sequence diversity. In addition, there is evidence of simultaneous host rhinovirus infections that makes the production of common cold vaccines very difficult if not impossible.

Respiratory coronaviruses infect the same respiratory epithelium as do rhinoviruses and spread via direct contact with infected secretions or large aerosol droplets. Coronavirus (COVID-19) infection in humans is unusual and human pathogenic coronaviruses (severe acute respiratory syndrome coronavirus [SARS-CoV] and SARSCoV-2) bind to their target cells through angiotensin-converting enzyme 2 (ACE2), which is expressed by epithelial cells of the lung, intestine, kidney, upper airway, and blood vessels. The expression of ACE2 is substantially increased in patients with type 1 and type 2 diabetes, who are treated with ACE inhibitors and angiotensin II type-I receptor blockers (ARBs). Of interest, immunity develops soon after infection but wanes gradually over time. Reinfection is common, presumably because of waning immunity, but possibly because of antigenic variation within species. Only infection prevention will break this cycle of infection, reinfection, and spread. Reducing ACE2 expression in the lungs and reducing viral load in the alveola may reduce the severity of the infection and potentially reduce the spread of the virus.

A bronchiole and alveolar delivered disinfectant may reduce the spread of infectious pathogens locally in the lung such as *Staphylococcus aureus* and *Pseudomonas aeruginosa*. Other pulmonary infectious organisms that may be diminished in the lungs by HOCl delivery locally include: viral (respiratory syncytial virus, Influenza A/B, other Corona viruses such as SARS, MERS, and Hantavirus, fungal (*coccidioides, histoplasma, blastomyces*) and bacterial infections.

Previous methods for producing hypochlorous acid solutions have undesirable byproducts. For example, hypochlorous acid solutions have been produced by electrolysis. However, hypochlorous acid solutions produced by electrolysis have unavoidable amounts of metals in solution at least due to the presence of the metal electrodes used in the electrolysis methods. An amount of the metals used as electrodes in the electrolysis process dissolve into the solution. These amounts of metals may be harmful to human patients exposed to the hypochlorous acid solutions produced from electrolysis. Particularly harmful is a human patient absorbing a hypochlorous acid solution produced by electrolysis in pulmonary alveolar or bronchial surfaces as the metal included in the solution may enter the blood stream, harming the human patient. Furthermore, a human patient absorbing a hypochlorous acid solution produced by electrolysis via the respiratory tract, the nasal cavity, the nasopharynx, the nasal vestibule, the nasal respiratory region, or the nasal olfactory region may similarly have a portion of the metals included in the hypochlorous acid solution produced by electrolysis enter the bloodstream and harm the human patient.

Furthermore, conventional electrolysis devices for preparation of hypochlorous acid solutions include an electrolytic cell as well as cathodic and anodic electrolytic sheets located within the electrolytic cell. The electrolytic cell is equipped with an ion membrane, which separates the electrolytic cell into an anodic side and a cathodic side. The preparation principle is: water added with salt, NaCl, is electrolyzed through the electrolysis device equipped with the ion membrane; since the anodic side and the cathodic side of the electrolytic cell are separated by the ion membrane, chlorine is generated from the $Cl^-$ at the anode, which is then reacts with $H_2O$ to generate hydrochloric acid (HCl) and hypochlorous acid (HOCl), thus water from the anode tank contains 10-50 mg/L available chlorine.

Creation of hypochlorite from hypochlorous acid using electrolysis techniques can produce relatively small volumes and of low concentration but these processes are expensive with consumable, semipermeable membranes of platinum and titanium. Additionally, the stability of the $OCl^-$ and HOCl is short lived. Large volumes for the viral disinfecting of large edifices and mobile facilities such as infectious disease wards and entire hospital facilities, cruise ships, etc., especially in epidemic and pandemic situations, may be urgently needed.

Conventional industrial electrolysis devices for the preparation of hypochlorous water have detrimental properties as well. For example, the use of the electrolytic cell with an ion membrane to generate hypochlorous acid solutions needs ion membranes. The ion membranes are expensive and easy to break during the electrolysis process, and accordingly affect the efficiency of electrolysis. During the production process with conventional dual-slot diaphragm electrolysis method, hypochlorous acid solution is generated at the anode tank, and a same amount of alkaline solution is obtained at the cathode tank.

During previous electrolysis processes, high current will generate heat through the electrolytic sheets. Such heat will increase the impedance of the electrolytic sheets, thereby reducing the current flow to impact chlorine production capacity, and affecting production efficiency of hypochlorous water. It is accordingly necessary to improve the conventional electrolysis devices for preparation of hypochlorous acid solutions.

Previous industrial production of hypochlorous acid is produced for use on non-biologic (inanimate) surfaces such as floors, walls, and inanimate objects and the pH, ionic concentrations and starting water purity and electrolytes are not for use on body surface and mucous membranes and conjunctival sterilization. These previously formulated industrial disinfectants can be irritating or injurious to the human and animal body surface tissues.

In addition, previously, hypochlorous acid solutions have been produced by chemical reactions. For example, previously, hypochlorous acid solutions has been produced by a reaction between chlorine gas ($Cl_2$) added to water ($H_2O$) to produce hydrogen ions, chloride ions, and hypochlorous acid. Alternatively, or in addition, previous hypochlorous acid solutions have been produced by a series of chemical reactions between chlorine gas and sodium hydroxide to produce sodium hypochlorite, sodium chloride, and water. Sodium hypochlorite (NaOCl) reacts with water ($H_2O$) to form hypochlorous acid (HOCl) and hypochlorite ions ($OCl^-$). The hypochlorite ion breaks down to chlorine and oxygen atoms. Finally, depending on the pH value, the concentration of hypochlorous acid (HOCl) is related to the concentration of hypochlorite ions ($OCl^-$). In either of these previous chemical reaction mechanisms, however, toxic chlorine gas is released, which makes these previous methods hazardous for humans to perform.

Sodium hypochlorite is used on a large scale in agriculture, chemical industries, paint- and lime industries, food industries, glass industries, paper industries, pharmaceutical industries, synthetics industries and waste disposal industries. In the textile industry sodium hypochlorite is used to bleach textile. It is sometimes added to industrial waste water. This is done to reduce odors. Hypochlorite neutralizes sulphur hydrogen gas (SH) and ammonia ($NH_3$). It is also used to detoxify cyanide baths in metal industries. Hypochlorite can be used to prevent algae and shellfish growth in cooling towers. In water treatment, hypochlorite is used to disinfect water. In households, hypochlorite is used frequently for the purification and disinfection of the house.

There are no threshold values for sodium hypochlorite exposure in humans. Various health effects occur after exposure to sodium hypochlorite. People are exposed to sodium hypochlorite by inhalation of aerosols which causes coughing and a sore throat. After swallowing sodium hypochlorite, the effects are stomach ache, a burning sensation, coughing, diarrhea, a sore throat and vomiting. Sodium hypochlorite on skin or eyes causes redness and pain. After prolonged exposure, the skin can become sensitive. Sodium hypochlorite is poisonous for water organisms. It is mutagenic and very toxic when it comes in contact with ammonium salts Accordingly, there is a need for improved production methods and resulting hypochlorous acid solutions in order to combat and prevent infectious disease.

SUMMARY

In accordance with an embodiment of the invention, a method of making an acid solution is provided. The method includes exposing a reactant solution to an energy beam to form the acid solution. The reactant solution includes water and a salt, wherein the salt is selected from a group consisting of a chloride salt and a bromide salt. The acid solution is a hypochlorous acid solution or a hypobromous acid solution.

In accordance with another embodiment of the invention, the energy beam used in the method includes an electron beam at an energy of up to 15 MeV.

In accordance with another embodiment of the invention, the energy beam used in the method includes an alpha beam at an energy of up to 10 MeV.

In accordance with another embodiment of the invention, the energy beam includes a gamma ray from gamma units at an energy of up to 10 MeV or from cobalt-60 units.

In accordance with another embodiment of the invention, the energy beam used in the method includes an isotopic alpha particle energy beam, wherein the alpha particles are sourced from a material selected from a group consisting of actinium, americium, curium, neptunium, plutonium, radium, and uranium.

In accordance with another embodiment of the invention, the energy beam includes protons from a proton unit at an energy of up to 10 MeV.

In accordance with another embodiment of the invention, the energy beam includes fast neutrons produced from a nuclear reactor core.

In accordance with another embodiment of the invention, the energy beam includes comprises ultraviolet radiation produced by atomic excitation in a gaseous discharge tube.

In accordance with another embodiment of the invention, the energy beam includes X-rays at an energy of up to 100 keV.

In accordance with another embodiment of the invention, the chloride salt is selected from a group consisting of sodium chloride, magnesium chloride, calcium chloride and potassium chloride.

In accordance with another embodiment of the invention, the bromide salt is selected from a group consisting of sodium bromide, magnesium bromide, calcium bromide and potassium bromide.

In accordance with another embodiment of the invention, the reactant solution includes water and a salt, wherein water is present in an amount of at least 99.00 wt % of the reactant solution.

In accordance with another embodiment of the invention, the energy beam operates at an energy of between 0 MeV and 15 MeV.

In accordance with another embodiment of the invention, the energy beam discharges a current of between 0 A and 10 A.

In accordance with another embodiment of the invention, the energy beam discharges a current of between 0 mA and 50 mA.

In accordance with another embodiment of the invention, a method of inactivating a pathogen is provided. The method includes contacting the pathogen with an acid solution made from the method previously provided.

In accordance with another embodiment of the invention, the method of inactivating a pathogen includes inactivating either COVID-19 or Influenza A.

In accordance with another embodiment of the invention, the method of inactivating a pathogen includes depositing the acid solution on a pulmonary alveolar or bronchial surface of a human.

In accordance with another embodiment of the invention, the method of inactivating a pathogen includes depositing the acid solution on a human nasal cavity or human naso-pharyngeal mucous membrane.

In accordance with another embodiment of the invention, an acid solution is provided. The acid solution includes an acid selected from a group consisting of hypochlorous acid and hypobromous acid. The acid solution further includes water. The acid solution further includes a salt selected from a group consisting of a chloride salt, a hypochlorite salt, a bromide salt, a hypobromite salt, and combinations thereof. The acid solution is free of metal and metal ions.

In accordance with another embodiment of the invention, the acid is present in a concentration of between 1 ppm and 20 ppm of the acid solution.

In accordance with another embodiment of the invention, the acid is present in a concentration of between 5 ppm and 10 ppm of the acid solution.

DETAILED DESCRIPTION

All concentrations herein are based on the total weight of the specified disinfectant composition, unless stated otherwise. Weight percent, weight %, wt. %, wt %, percent by weight, and % by weight are synonyms that refer to the concentration of a substance as the weight of that substance, divided by the weight of the composition, and multiplied by 100. In addition, all ranges of values include the end points of the ranges.

The immune system's elegant response against invading pathogens is to generate an effective group of highly reactive chemicals, such as reactive oxygen species (ROS). For instance, the mitochondrial membrane-bound enzyme nicotinamide adenine dinucleotide phosphate-oxidase (NADPH) is a primary enzyme responsible for ROS production in intact cells. Activation of neutrophils generate respiratory bursts producing hydrogen peroxide ($H_2O_2$) which then through myeloperoxidase converts $H_2O_2$ to hypochlorous acid (HOCl) in the presence of $Cl^-$ and $H^+$. Hypochlorous acid leads to cell death by the oxidation of sulfhydryl enzymes and amino acids, ring chlorination of amino acids, loss of intracellular contents, decreased uptake of nutrients, inhibition of protein synthesis, decreased oxygen uptake, oxidation of respiratory components, decreased adenosine triphosphate production, breaks in DNA, and depressed DNA synthesis. Taken together, these activities have effective, broad spectrum activity against all bacterial, viral, and fungal human pathogens. Further, a small amount of HOCl can kill spore-forming and non-spore bacteria in a very short time period which is critical for long-lasting effects against these pathogens.

Hypochlorous acid (HOCl) forms hypochlorite ions ($OCl^-$) that are known to react and denature biological molecules, in particular prokaryotic cells and viruses. Hypochlorous acid is produced by mammalian and non-mammalian animals in immune and infection fighting cells such as neutrophils as a method of disabling infectious microorganisms. Hypochlorous acid is electrically neutral while hypochlorite ions are electrically negative, and when bound together, form free available chlorine resulting in disinfection. Both substances have very distinctive behavior. In the case of prokaryotes, pathogenic microorganism cell walls are negatively charged and the cell wall can only be penetrated by the neutral hypochlorous acid, but not by negatively charged hypochlorite ion. Once penetrated by hypochlorous acid, these cells die from inability to reproduce. Negatively charged hypochlorite ion cannot penetrate cell walls, but rather is produced in the cell when the hypochlorous acid enters the cell. Hypochlorous acid is a more reactive and much stronger disinfectant than hypochlorite as hypochlorous acid is split into hydrochloric acid (HCl) and an oxygen (O) atom. Oxygen is also a very powerful disinfectant. In the case of viruses, the combined hypochlorous acid and hypochlorite are exposed to the virion and denature its DNA and or RNA.

It is known that 0.5% and 1% sodium hypochlorite solutions have been confirmed to effectively destroy the Ebola virus. The efficiency of the Ebola virus disinfection by sodium hypochlorite treatment is correlated to the concentration of sodium hypochlorite in solution and the length of contact time the Ebola virus is exposed to the sodium hypochlorite solution, with exposure times of at least several minutes required. Higher concentrations of sodium hypochlorite and longer contact times have achieved greater viral denaturation. The antimicrobial effect of hypochlorous acid is thought to be due to a combination of the concentration of hypochlorous acid and the duration of exposure. The exposure time results in the creation of hypochlorite ions that result in the formation of disulfide bonds that cross link cellular amino acids, inactivating the infectious microorganism but not affecting eukaryote cells. Hypochlorous acid having a reported $LD_{50}$ of between 0.0104-0.156 ppm and 2.6 ppm caused 100% growth inhibition in 5 minutes. In view of the above, it has been shown that exposing pathogens to hypochlorous acid is effective at destroying the pathogens exposed.

Viral testing in BSL-3 laboratory utilizing low ppm HOCl was tested on SARS COVID-19 and Influenza A at concentrations of between 1 ppm and 25 ppm. The HOCl treatment killed the SARS COVID-19 and Influenza A in these concentrations. A TCID 50% for both of these viruses using 5-minute exposure to the HOCl at concentrations of 1 ppm, 2.5 ppm, 10 ppm, and 25 ppm were all viral kill positive.

In contrast to electrolysis or previously used chemical reaction mechanisms, the inventive method and chemical solution involve either a hypochlorous acid solution or hypobromous acid solution described herein being produced by a method of exposing a reactant solution to an energy beam. The energy beam can be selected from a group consisting of an electron beam (at an energy of up to 15 MeV), an isotopic alpha particle beam, a low energy (i.e., reduced radioactive or non-radioactive by-product forming energies) proton (i.e., a stable subatomic particle with a positive electric charge; at an energy of up to 10 MeV) unit beam, alpha (i.e., 2 protons and 2 neutrons identical to a helium-4 nucleus; at an energy of up to 10 MeV) beam units, gamma rays from gamma units at an energy of up to 10 MeV or from cobalt-60 units, fast neutrons produced by a nuclear reactor core, and combinations thereof. Additionally, X-rays at an energy of up to 100 keV may be used and ultraviolet radiation, produced for example by atomic excitation in a gaseous discharge tube, can also be used to expose a reactant solution to this energy form to create a hypochlorous acid solution or hypobromous acid solution.

In an embodiment wherein a hypochlorous acid solution is produced, the reactant solution exposed to the energy beam includes water having a chloride salt dissolved in the water. Non-limiting examples of the chloride salt may be selected from a group consisting of sodium chloride, magnesium chloride, calcium chloride, potassium chloride, and combinations thereof. In an embodiment wherein a hypobromous solution is produced, the reactant solution exposed to the energy beam includes water having a bromide salt dissolved in the water. Non-limiting examples of the bromide salt may be selected from a group consisting of sodium bromide, magnesium bromide, calcium bromide, potassium bromide, and combinations thereof.

While hypochlorous acid is present in the hypochlorous acid solution and hypobromous acid is present in the hypobromous acid solution according to the invention, an amount of hypochlorite salt or hypobromite salt is also produced. In an embodiment, the concentration of the hypochlorite salt is between 3 wt % and 6 wt % of the hypochlorous acid solution. In an embodiment, the concentration of the hypochlorite salt is less than 1 wt % of the hypochlorous acid solution. In an embodiment, the concentration of the hypochlorite salt is between 0.013 wt % and 0.1 wt % of the hypochlorous acid solution. In an embodiment, the concentration of the hypobromite salt is between 3 wt % and 6 wt % of the hypobromous acid solution. In an embodiment, the concentration of the hypobromite salt is less than 1 wt % of the hypobromous acid solution. In an embodiment, the concentration of the hypobromite salt is between 0.013 wt % and 0.1 wt % of the hypobromous acid solution.

Actual experimental results showing the electron beam production of hypochlorous and hypobromous acid are shown in figure below in TABLE 1:

TABLE 1

EXPERIMENTAL RESULTS OF PRODUCTION HYPOCHLOROUS ACID SOLUTION OR HYPOBROMOUS ACID SOLUTION BY ELECTRON ENERGY BEAM

| Vial # | Salt | Molarity | pH | Phosphate buffer | Additional Reagent | Air Gap | Container | Oct. 9, 2020<br>Oct. 12, 2020<br>Replicate A | Oct. 13, 2020<br>Replicate B | Oct. 18, 2020<br>*Oct. 20, 2020*<br>Replicate C |
|---|---|---|---|---|---|---|---|---|---|---|
| 1 | NaCl | 3 | 4 | 0.1M | N | N | LS | A<br>3.84 | B<br>2.24 | C<br>2.08 |
| 2 | NaCl | 3 | 4 | 0.1M | N | Y | LS | A<br>4.4<br>*2.2* | B<br>1.6 | 2.48 |
| 3 | NaCl | 3 | 4 | 0.1M | N | N | Spray | A<br>2.68<br>1.24 | B<br>0.7 | C<br>0.81 |
| 4 | NaCl | 3 | 4 | 0.1M | N | Y | Spray | A<br>0.24 | | |
| 5 | NaCl | 3 | 4 | 0.1M | Peroxide | N | LS | A<br>0 | B<br>0 | C<br>0 |
| 6 | NaCl | 3 | 4 | 0.1M | Peroxide | N | Spray | A<br>0 | | |
| 7 | NaCl | 1.5 | 4 | 0.1M | N | N | LS | A<br>0<br>0 | B<br>0 | C<br>0 |
| 8 | NaCl | 1.5 | 4 | 0.1M | N | Y | Spray | A<br>0 | | |
| 9 | NaCl | 0.5 | 4 | 0.1M | N | N | LS | A<br>0 | B<br>0 | C<br>0 |
| 10 | NaCl | 0.5 | 4 | 0.1M | N | Y | Spray | A<br>0 | | |
| 11 | NaCl | 3 | 3 | 0.1M | N | N | LS | A<br>7.52<br>5.04eb;normal | B<br>5.32 | C<br>6.92 |
| 12 | NaCl | 3 | 3 | 0.1M | N | N | Spray | A<br>6.32 | | |
| 13 | NaBr | 3 | 5 | 0.1M | N | N | LS | A<br>21 | B<br>48.6 | C<br>27 |

TABLE 1-continued

EXPERIMENTAL RESULTS OF PRODUCTION HYPOCHLOROUS ACID SOLUTION OR HYPOBROMOUS ACID SOLUTION BY ELECTRON ENERGY BEAM

| Vial # | Salt | Molarity | pH | Phosphate buffer | Additional Reagent | Air Gap | Container | Oct. 9, 2020<br>Oct. 12, 2020<br>Replicate A | Oct. 13, 2020<br>Replicate B | Oct. 18, 2020<br>*Oct. 20, 2020*<br>Replicate C |
|---|---|---|---|---|---|---|---|---|---|---|
| | | | | | | | | | | *3.5* |
| 14 | NaBr | 3 | 5 | 0.1M | N | N | Spray | A<br>17 | | |
| 15 | NaBr | 3 | 6 | 0.1M | N | N | LS | A<br>7.2<br>5.32 | B<br>21.8 | C<br>5.4 |
| 16 | NaBr | 3 | 6 | 0.1M | N | N | Spray | A<br>19.6 | | |
| 17 | NaBr | 3 | 7 | 0.1M | N | N | LS | A<br>9.8 | B<br>3.4 | C<br>14.2<br>*13.4* |
| 18 | NaBr | 3 | 7 | 0.1M | N | N | Spray | A<br>19.18<br>13.7 | | |

The electron beam setting results shown above were as follows; 20 kGy with the usual dose of 5-20 kGy and doses of increasing productivity of the solution at 50-100 kGy.

In some examples, the hypochlorous acid solution or hypobromous acid solution has a pH between 5 and 7. It has been discovered that levels of hypochlorite in the hypochlorous acid solution will decrease if the pH of the solution is less than 5 or greater than 7 compared to the levels of hypochlorous acid in the hypochlorous acid solution having a pH between 5 and 7. In a preferred embodiment, the hypochlorous acid solution has a pH of 6.5, and in this embodiment, the hypochlorous acid-to-hypochlorite ion is present in the hypochlorous acid solution in a ratio of 9:1 by mole, or greater. Similarly, it has been discovered that levels of hypobromite will decrease in the hypobromous acid solution if the pH of the solution is less than 5 or greater than 7 compared to the levels of hypobromous acid in the hypobromous acid solution having a pH between 5 and 7.

In an embodiment including an isotopic alpha particle beam as the energy beam, the isotopic alpha particle beam may operate by supplying a beam of isotopic alpha particles directed at the reactants. In an embodiment, the alpha particle beam is supplied alpha particles to be used in the beam from isotopes such as actinium, americium, curium, neptunium, plutonium, radium, and uranium. In another embodiment, the alpha particle beam is supplied alpha particles to be used in the beam from isotopes having a life of years, for example actinium-225, which has a half-life of 21.7 years). Isotopes with a half-life of years are particularly preferred at least because radiation byproducts are substantially avoided. In an embodiment, exposing the reactant solution to an isotopic alpha particle beam operating at 5 MeV for 1.1 hours at a beam current of 10 mA may produce a liter of suitable hypochlorous acid solution or hypobromous acid solution. In this embodiment, radioisotope byproducts are not produced.

Furthermore, in producing the hypochlorous acid solution or the hypobromous acid solution, the energy beam may discharge an energy of between 0 MeV and 15 MeV. In an embodiment involving an electron beam, the energy beam may discharge a current of between 0 A and 10 A. In an embodiment involving a low energy, proton unit beam or an alpha particle beam, the energy beam may discharge at a current of between 0 mA and 50 mA.

In an embodiment, the hypochlorous acid solution may be produced by a method including using an energy beam aimed directly vertically downward such that the energy beam contacts a static pool of reactant solution or flowing reactant solution. Alternatively, or in addition, in an embodiment, the hypochlorous acid solution may be produced by a method using an energy beam aimed at the reactant solution flowing at an incline. Alternatively, or in addition, in an embodiment, the hypochlorous acid solution may be produced by an energy beam aimed at the reactant solution flowing vertically on a quartz plate that is sufficiently bent in order to create a Coanda flow effect where the energy beam source, is directed at a horizontal slot in the quartz plate in order to prevent direct exposure of the energy beam to the reactant solution fall flow with an ultra-thin separation membrane such as a polyester film. The polyester film may be Mylar or a polyimide tape such as Kapton. In each of these embodiments, the reactant solution may have a purity of 99.00 wt % of water, with the balance including a chloride salt. Alternatively, in an embodiment, the hypobromous acid solution may be produced by a method including using an energy beam aimed directly vertically downward such that the energy beam contacts a static pool of reactant solution or flowing reactant solution. Alternatively, or in addition, in an embodiment, the hypobromous acid solution may be produced by a method using an energy beam aimed at reactant solution flowing at an incline. Alternatively, or in addition, in an embodiment, the hypobromous acid solution may be produced by an energy beam aimed at reactant solution flowing vertically on a quartz plate that is sufficiently bent in order to create a Coanda flow effect where the energy beam source, is directed at a horizontal slot in the quartz plate in order to prevent direct exposure of the energy beam to the reactant solution fall flow with an ultra-thin separation membrane such as a polyester film. The polyester film may be Mylar or a polyimide tape such as Kapton. In each of these embodiments, the reactant solution may have a purity of 99.00 wt % of water, with the balance including a bromide salt.

The hypochlorous acid solution and hypobromous acid solution described are free of metals, and are able to be safely administered to human patients in a variety of treatment procedures. In some examples, the hypochlorous acid solution may be applied to a topical external surface or wound of a human and/or animal patient. Alternatively, or in addition, the hypochlorous acid solution may be administered through the pulmonary alveolar and bronchial pathways of the human body and accordingly deposited on the pulmonary alveolar and bronchial surfaces. Alternatively, or in addition, the hypochlorous acid solution or hypobromous acid solution may be administered to or deposited on a human patient's nasal cavity and/or nasopharyngeal mucous membrane.

The nasal cavity is the most superior part of the respiratory tract. It extends from the vestibule of the nose to the nasopharynx and is composed of three segments, (1) the vestibule—the area surrounding the external opening to the nasal cavity, (2) the respiratory region—lined by a ciliated pseudostratified epithelium, interspersed with mucous-secreting goblet cells, and (3) the olfactory region—at the apex of the nasal cavity and lined by olfactory cells with olfactory receptors. The nasopharynx is the space above the soft palate at the back of the nose and connects the nose to the mouth, which allows a person to breathe through the nose. The soft palate separates the nasopharynx from the oropharynx, which sits just below the soft palate. Alternatively, or in addition, the hypochlorous acid solution and hypobromous acid solution may inactivate microbial organisms including viruses, prokaryotes, and other pathogens exposed to the hypochlorous acid solution or hypobromous acid solution. The hypochlorous acid solution or hypobromous acid solution may be administered to a human patient's body surface, a mucous membrane, or conjunctivae.

Infectious agents can occupy and multiply in the moist mucous membranes of the nasal cavity and nasopharynx. Because of the convoluted air pathway of the respiratory nasal cavity these pathways can act as pathogen culture sites with optimal culture media being the moist membranes and its mucous secretions.

Treatment of infection and diminution in the depot of organisms in the most external and most exposed respiratory system, the nose, can reduce infection to the external environment and as well as more internally. The respiratory system can transmit pathogens to other external surfaces and to other animals. The upper respiratory system can be a conduit and transmission source for a body infection. This occurs through systemic spread and through 'drop infection' to the lower respiratory system, including the lung alveoli. Reduction of pathogen accumulation in the nasal vestibule, nasal respiratory region nasal olfactory region and the nasopharynx is a method of 'debulking' or reducing the pathogen load. Viruses and bacteria that can be sequestered in the nasal cavity and nasopharynx can include coronaviruses that infect the same respiratory epithelium as do rhinoviruses and spread via direct contact with infected secretions or large aerosol droplets. Coronavirus (COVID-19) infection in humans and human pathogenic coronaviruses (severe acute respiratory syndrome coronavirus [SARS-CoV] and SARS-CoV-2) bind to their target cells through angiotensin-converting enzyme 2 (ACE2), which is expressed by epithelial cells of the lung, intestine, kidney, and blood vessels. These and many other viruses enter the lower respiratory system through inhalation and conduction of these viruses across the nasal cavity and nasopharynx where they may 'seed' the lower airways. Reducing viral load initially in the upper airway is also thought, in some cases to reduce the severity of the infection and potentially reduce the spread of the virus.

A nasal cavity and nasopharyngeal delivered disinfectant may reduce the spread of infectious pathogens to the lower respiratory pathway such as pneumococcal bacteria. The risk of other respiratory infectious organisms that may be diminished in the lungs by hypochlorous acid (HOCl) delivery locally first to the upper airways and these pathogens include: viruses, fungi and bacteria.

As explained above, the inventive hypochlorous acid solution or hypobromous acid solution including a pathogen neutralizing or killing agent, in this case HOCl or HOBr, respectively, can be administered to the nasal and nasopharyngeal mucous membrane by the several methods. The hypochlorous acid solution or hypobromous acid solution can be included in a variety of products. In some examples, these products are selected from a group consisting of nasal drops, squirt tube delivery containers, squeeze bottles, metered-dose spray pumps, single-dose spray pumps, duodose spray pumps, nasal pressurized metered-dose inhalers, mismatch between geometry of anterior nose and the spray plume, powdered nebulizers and atomizers, pulsating aerosol generated via a perforated vibrating membrane, handheld battery-driven atomizers, impel nitrogen-driven atomizers, breath-powered bi-directional technology. In some examples, the container in which the hypochlorous acid solution or hypobromous acid solution is manufactured may include a vacuum space in the space inside the container which is not occupied by the hypochlorous acid solution or hypobromous acid solution. Alternatively, in some examples, the container in which the hypochlorous acid solution or hypobromous acid solution is manufactured may include an inert gas in the space inside the container which is not occupied by the hypochlorous acid solution or hypobromous acid solution.

In a preferred embodiment, the energy beam is an electron beam. Energy beams utilizing particles or energy that yield radioactive byproducts are suitable to be used to generate hypochlorous acid solutions and hypobromous acid solutions according to the present invention, however, there have been concerns about the possibility of nuclear waste repositories located near subterranean salt formations having the possibility of chloride brine being exposed to nuclear waste. These concerns are regarding the resultant formation of hypochlorite and hypochlorous acid that may lead to free radicals and ionic species being created. Simulations using high energy beams of alpha particles and other energy sources have confirmed this possibility. Theoretically, a manufacturing technique that produces large volumes of high concentration hypochlorous acid (HOCl) and resultant hypochlorite ($OCl^-$) and other species can be produced using alpha generation isotopes, alpha generating LINAC and fast neutron generating research nuclear reactors. The use of 10 MeV protons and 10 MeV helium ions (alpha particles) using various energy sources would be sufficient to produce $OCl^-$ and HOCl. Salt solutions of NaCl and MgCl in $H_2O$ can be used.

Comparative testing of commercial brands of sodium hypochlorite/hypochlorous solutions (NaClO/HClO) demonstrated various levels of keratinocyte and fibroblast cytotoxicity depending on concentration and exposure time. In general, higher levels of sodium hypochlorite had higher levels of keratinocyte and fibroblast toxicity.

The methods of producing hypochlorous acid solutions or hypobromous acid solutions described herein have several advantages over previously conceived methods. The advantages are not necessarily limited to those found in the following paragraphs, as some advantages have been described previously. In addition, advantages other than those described herein may be present in the inventive solutions over those previously discovered. Embodiments of the hypochlorous acid solutions and hypobromous acid solutions described herein may have advantages over conventional solutions such as: (1) an absence of metal, even trace amounts, in the solution; (2) a low concentration of hypochlorous acid or hypobromous acid, in some embodiments, the concentration may be as low as between 1 ppm and 20 ppm; (3) increased stability which includes a longer shelf-life; and (4) disinfecting activity toward both prokaryote and eukaryote pathogens.

The lack of metal in the hypochlorous acid solutions and hypobromous acid solutions described herein is described above. The hypochlorous acid solutions and hypobromous acid solutions described herein may include a relatively low concentration of hypochlorous acid or hypobromous acid. The methods described herein allow producers of hypochlorous acid solutions or hypobromous acid solutions to particularly tune the concentrations to be selectively manufactured for human mucous membrane safe application. While hypochlorous acid solutions and hypobromous acid solutions produced by conventional methods (i.e., electrolysis) can achieve concentrations of hypochlorous acid or hypobromous acid in solution in a range of between 70 ppm and 80 ppm, the hypochlorous acid solutions and hypobromous acid solutions described herein are able to be formed having far reduced concentrations by comparison. For example, in some embodiments, the concentration of hypochlorous acid in the hypochlorous acid solution is between 1 ppm and 20 ppm of the hypochlorous acid solution. In another embodiment, the concentration of hypochlorous acid in the hypochlorous acid solution is between 5 ppm and 10 ppm of the hypochlorous acid solution. In some embodiments, the concentration of hypobromous acid in the hypobromous acid solution is between 1 ppm and 20 ppm of the hypobromous acid solution. In another embodiment, the concentration of hypobromous acid in the hypobromous acid solution is between 5 ppm and 10 ppm of the hypobromous acid solution. Alternatively, the concentration of the hypochlorous acid or hypobromous acid in solution may be produced to be greater than 1 wt % of the solution, allowing for effective disinfecting of surfaces to which the solution is applied. In addition, the methods described herein are tailored to provide highly efficient and reproducible production and continuous production of hypochlorous acid solutions and hypobromous acid solutions in large volumes. This reduced concentration of hypochlorous acid or hypobromous acid that is achieved in the solutions described herein is an improvement over conventional solutions at least because conventional solutions which have concentrations of hypochlorous acid or hypobromous acid greater than the low concentrations of the solutions described herein may be harmful or irritating to human medical patients to which the conventional solutions are administered.

The hypochlorous acid solutions and hypobromous acid solutions described herein are more stable than their conventional counterparts. For example, the hypochlorous acid solution or the hypobromous acid solution may be produced in a container in which the respective solution will be dispensed when the respective solution is used to disinfect. Put another way, the hypochlorous acid solution or the hypobromous acid solution may be produced without exposing the respective solutions to any contaminating environments such as air. Indeed, in an embodiment, the hypochlorous acid solution or the hypobromous acid solution is produced in a hermetically sealed environment. In some embodiments, the hypochlorous acid solution or hypobromous acid solution is produced in a container having an inert gas in a headspace of the container, such as a millimeter to a centimeter above the solution. Inert gases that can be used include nitrogen, carbon dioxide, argon, helium and other noble gases Furthermore, the shelf-life of the hypochlorous acid solutions and hypobromous acid solutions described herein is increased compared to conventional hypochlorous acid solutions and hypobromous acid solutions. Conventional hypochlorous acid solutions and hypobromous acid solutions are less stable at least because these conventional solutions lose some concentration of hypochlorous acid or hypobromous acid in time after formation of the solution. This loss of concentration is a result of the conventional hypochlorous acid solutions or hypobromous acid solutions having been exposed to contaminating species such as air, which causes the hypochlorous acid and hypobromous acid included in these solutions to denature. Indeed, it is often the case that conventional hypochlorous acid solutions and hypobromous acid solutions are manufactured to include concentrations of hypochlorous acid or hypobromous acid of between 150 ppm and 200 ppm, with the intent to have a portion of the respective acid denature, for example during the transportation or shelf-life of the conventional solution, and arriving at a concentration of, for example, between 70 ppm and 80 ppm at the time of administration of the conventional solution. In contrast, at least because the inventive hypochlorous acid solutions and hypobromous acid solutions described herein may be manufactured without ever being exposed to contaminating species, such as air, during production, the concentration of the hypochlorous acid and hypobromous acid in solution is stable, and may be manufactured to be immediately administrable to human patients without causing the human patients harm or irritation. In some embodiments, at least because the hypochlorous acid solution or hypobromous acid solution is produced in a hermetically sealed environment, the shelf life of the hypochlorous acid solution or hypobromous acid solution is between 6 months and 5 years which allows for distant shipping capabilities and on-site use.

Moreover, the energy received by the reactant solution from the energy beam during production of the hypochlorous acid solution or hypobromous acid solution conveniently sterilizes the solution produced, and specifically sterilizes the HOCl or HOBr against multicellular organisms including both prokaryotes and eukaryotes. In contrast, conventional hypochlorous acid solutions or hypobromous acid solutions destroy only prokaryotes that are subsequently introduced into the final solution.

The materials used to produce the hypochlorous acid solution or hypobromous acid solution are minimal energy production consumables, i.e., the presently described methods avoid the use of semipermeable membranes, electrodes, or other fragile, wasteful materials.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative product and method and illustrative examples shown and described. Accordingly, departures may be made from such details without departing from the scope of the general inventive concept.

What is claimed is:

1. A method of making an acid solution, the method comprising:

exposing a reactant solution to an energy beam to form the acid solution, the reactant solution comprising water and a salt, wherein the salt is selected from a group consisting of a chloride salt and a bromide salt, and the acid solution is a hypochlorous acid solution or a hypobromous acid solution;

wherein the energy beam comprises an electron beam at an energy of up to 15 MeV.

2. The method of claim 1, wherein the chloride salt is selected from a group consisting of sodium chloride, magnesium chloride, calcium chloride and potassium chloride.

3. The method of claim 1, wherein the bromide salt is selected from a group consisting of sodium bromide, magnesium bromide, calcium bromide and potassium bromide.

4. The method of claim 1, wherein the reactant solution comprises water and a salt, wherein water is present in an amount of at least 99.00 wt % of the reactant solution.

5. The method of claim 1, wherein the energy beam operates at an energy of between 0 MeV and 15 MeV.

6. The method of claim 1, wherein the energy beam discharges a current of between 0 A and 10 A.

7. The method of claim 1, wherein the energy beam discharges a current of between 0 mA and 50 mA.

8. A method of making an acid solution, the method comprising:

exposing a reactant solution to an energy beam to form the acid solution, the reactant solution comprising water and a salt, wherein the salt is a bromide salt selected from a group consisting of sodium bromide, magnesium bromide, calcium bromide and potassium bromide, and the acid solution is a hypobromous acid solution.

9. The method in claim 8, wherein the energy beam comprises an electron beam at an energy of up to 15 MeV.

10. The method in claim 8, wherein the energy beam comprises gamma rays from gamma units at an energy of up to 10 MeV or from cobalt-60 units.

11. The method in claim 8, wherein the energy beam comprises ultraviolet radiation produced by atomic excitation in a gaseous discharge tube.

12. The method in claim 8, wherein the energy beam comprises X-rays at an energy of up to 100 keV.

13. The method of claim 8, wherein the reactant solution comprises water and a salt, wherein water is present in an amount of at least 99.00 wt % of the reactant solution.

14. The method of claim 8, wherein the energy beam operates at an energy of between 0 MeV and 15 MeV.

15. The method of claim 8, wherein the energy beam discharges a current of between 0 A and 10 A.

16. The method of claim 8, wherein the energy beam discharges a current of between 0 mA and 50 mA.

* * * * *